United States Patent [19]

Madison

[11] Patent Number: 5,306,557

[45] Date of Patent: Apr. 26, 1994

[54] COMPOSITE TACTICAL HARD BODY ARMOR

[76] Inventor: Thomas J. Madison, 25506 Many Oak Dr., Spring, Tex. 77380

[21] Appl. No.: 843,947

[22] Filed: Feb. 27, 1992

[51] Int. Cl.$^5$ .......................... F41H 1/02; B32B 5/12
[52] U.S. Cl. ................... 428/304.4; 428/911; 428/105; 428/109; 428/113; 428/220; 428/284; 428/285; 428/286; 428/287; 89/36.01; 89/36.02
[58] Field of Search ................. 2/2.5; 428/911, 304.4, 428/105, 109, 113, 220, 284, 785, 286, 287; 89/36.01, 36.02

[56] References Cited

U.S. PATENT DOCUMENTS

| | | |
|---|---|---|
| 4,660,223 | 4/1987 | Fritch . |
| 4,850,050 | 7/1989 | Droste et al. . |
| 4,989,266 | 2/1991 | Borgese et al. . |
| 5,059,467 | 10/1991 | Berkovitz . |

Primary Examiner—Patrick J. Ryan
Assistant Examiner—Richard C. Weisberger
Attorney, Agent, or Firm—Mary J. Gaskin

[57] ABSTRACT

A hard body armor system consisting of a boron carbide strike surface; aramid fiber layers; polyethylene fiber layers; two metallic foil layers with no binder between them; and a rigid foam layer; with carbon fiber layers on both surfaces. The metallic foil layers delaminate upon impact of a projectile, and the rigid foam layer provides room for the projectile to mushroom and expand, thereby reducing penetration and backface deformation. The system can be used in a configuration to protect the human torso; in a described embodiment, the front and back panels are interchangeable, and the two side panels are interchangeable. The panels, barrel-shaped to curve away from the torso, are held in proximity to each other by self-adjusting elastic.

10 Claims, 8 Drawing Sheets

COMPOSITE TACTICAL HARD BODY ARMOR

BACKGROUND OF THE INVENTION

This invention relates to improved hard body armor which protects the wearer from bullets, shrapnel, etc.

Modern-day body armor dates back to World War II when bomber crews used flak jackets, which were padded jackets containing steel, aluminum, or glass fiber plates combined with heavy nylon textiles.

The main discovery in improving body armor has been the use of heavy-weave nylon-type cloth made of aramid fibers. KEVLAR, sold by DuPont, is one brand of the ballistic cloth. So called soft ballistic armor, is made of multiple layers of woven fabric. The fabrics may be penetrated when yarn in the projectile's path is pushed aside or broken. The over-under weave of fabrics produces spots which are inherently weak where the fibers intersect. Improper interlacing or sewing of the layers of fiber can cause the strain wave to reflect, so that fibers break without dispersing a projectile's energy. Finally, the fibers in woven or sewn armor must overcome a state of crimp before they can be placed in tension.

Soft body armor has also been fabricated from polyethylene cloth. SPECTRA SHIELD, sold by Allied Signal Technologies, is a brand of such ballistic cloth. This material utilizes a unidirectional fiber in layers. The layers are cut, cross-plied (in a 0°, 90° orientation) and pressed to produce a single ply; the plies can be stacked to form a pliable material.

When the fibers of soft, woven armor stretch and break, a small fraction of the projectile's energy is absorbed in the process; the rest is transmitted through the armor layer to the body, having the effect of a heavy blow. The more filaments a projectile engages, the more efficient the energy absorption in, and the higher the degree of bullet deformation.

The energy which is not absorbed by the fibers causes backface deformation, in which material is displaced by the projectile's impact and comes into direct contact with the wearer's body. Excessive backface deformation results in severe blunt trauma, which can cause severe injury or death, even when the projectile does not penetrate the armor.

The most important factors to be considered in developing a new kind of body armor are: (1) its ability to prevent penetration of a projectile; and (2) its ability to reduce the amount of backface deformation. Other factors to be considered are the cost of the materials, the techniques of construction, and the comfort of the wearer.

The layering of different ballistic materials has been used to make armor panels of composites, which have greater stopping power than metal plates used in the past.

Protective body armor is classified by the National Institute of Justice (NIJ) based on the level of protection it offers; Class I, Class II, and Class IIIA armor are soft body armor. Class III armor protects from high-velocity rifle rounds 7.62 mm, 150/M-80 ball round and all lesser threats. Class IV protects against the armor-piercing round 30.06, 165/A.P., at 2850 ft/sec., and all lesser threats.

SUMMARY OF THE INVENTION

The invention described herein is a hard body armor system which provides Class III or Class IV protection against projectiles.

The system is a composite of non-woven materials. The fiber layers are arranged in eight different, unidirectional fiber orientations, an improvement over current art, which typically uses only two to four fiber orientations, typically at 0° and 90°.

A laser is used to cut the materials into the desired shapes. Laser cutting makes stitching the cut edges obsolete, and effectively prevents fraying.

The system is made up of a layer of outer layers of carbon fiber, layers of aramid fibers, layers of SPECTRA SHIELD fibers, at least one layer of back-to-back metallic foil layers, and an open-celled, rigid, foam layer.

When hit by a projectile, the metallic layers separate; this process of delamination allows the projectile to begin mushrooming between the layers, reducing penetration through the remaining layers.

The foam layer acts as an expansion layer, allowing a projectile room to mushroom and expand when it hits the last layer of SPECTRA SHIELD, thereby reducing backface deformation.

Most of the materials used in the composite armor have their own resin systems supplied by the manufacturer, so no additional resin needs to be added before molding.

The composite layers are pressure-molded and heated until cured.

Boron carbide layers can be placed below the outer surface to act as a hard-strike surface, raising the level of protection from Class III to Class IV.

Finally, the body armor material is described in a vest-type design which is quickly put on and has interchangeable side panels and front and back panels (for reduced production costs). The vest design distributes the armor's weight over a large surface area and keeps blunt trauma off the wearer's vital organs.

It is the main object of this invention to provide a body armor system which is capable of preventing penetration by a projectile and reducing excessive backface deformation caused by the projectile's impact.

It is another object of this invention to provide a hard body armor system for Class III or Class IV protection which is 40% to 60% lighter than present-day hard body armor.

It is still another object of this invention to provide armor with more fiber orientations than the prior art, thereby resulting in improved ballistic performance.

It is yet another object of this invention to use different ballistic materials with different strain wave velocities, resulting in a projectile's passing through the layers at differing penetration rates.

Another object of this invention is to have the impact from the projectile cause delamination of the metallic foil layers, thereby reducing penetration and deformation of the armor layers.

Yet another object of this invention is to provide an open-celled, rigid, foam layer between the back armor layers for bullet expansion, thereby reducing backface deformation.

Yet another object of this invention is to provide a design for a body armor system using outer layers of carbon fiber and boron carbide, which prevent the aramid fibers from degrading upon exposure to sunlight.

Still another object of this invention is to provide a hard armor system which will not shatter when hit or dropped, as would one using ceramic material.

Another object of this invention is to provide a hard armor system which is puncture and water-resistant.

It is yet another object of the invention to provide a hard-strike surface of boron carbide to increase the level of protection from Class III to Class IV.

It is yet another object of the invention to provide an armor system of non-woven materials with laser-cut edges.

It is still another object of this invention to provide a vest design that can be put on quickly, reduces fatigue on the wearer's shoulders, keeps blunt trauma off the wearer's vital organs, and yet has low production costs.

DESCRIPTION OF THE PREFERRED EMBODIMENT

Figure 1:
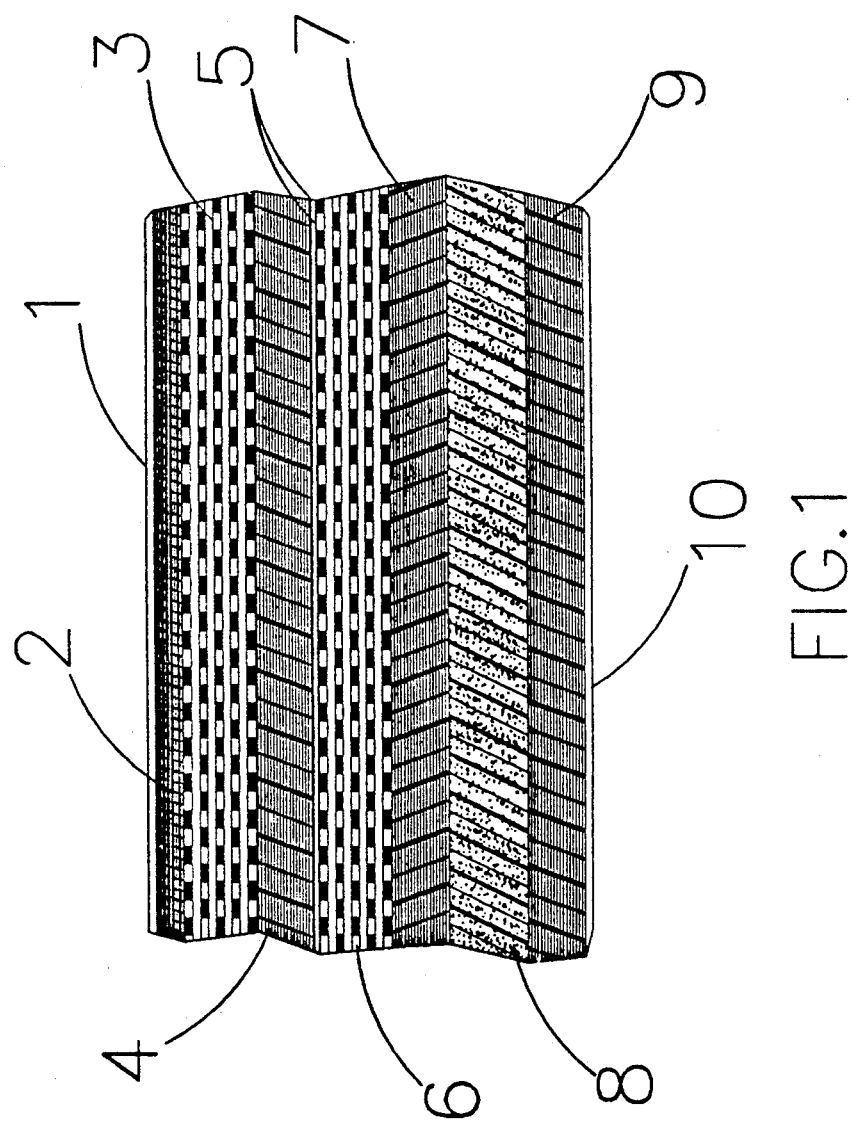
FIG. 1 is an enlarged cross-sectional view illustrating the different layers of composite materials which form the body armor.

FIG. 1 shows ten layers of composite materials which make up the body armor system. Layers 1 and 10 each has two layers of carbon fiber arranged at 0° and 90° orientations with a combined thickness of 0.016 inches.

Layer 2 is made up of thirteen layers of boron carbide, made by Textron, arranged in eight different unidirectional fiber orientations with a combined thickness of 0.091 inches.

Layers 3 and 6 are made of a non-woven aramid fiber known as HEXGARD IV from Hexcel; each fiber has a diameter of 0.0013 inches; they are arranged in eight unidirectional fiber orientations, with a combined thickness of 0.250 inches.

Layers 4, 7 and 9 are made up of SPECTRA SHIELD, a polyethylene material with a strain wave velocity of 12.300 m/sec. Each of the three layers contains forty laminations of SPECTRA SHIELD, which are symmetrically arranged in eight unidirectional fiber orientations, with a combined thickness of 0.200 inches.

Layer 5 has two layers of metallic foil, laid back to back, with no binder between the layers. Typically, each of these layers is 0.001 inches thick. (Layers of metallic foil can also be inserted between the other armor layers to enhance the delamination of the layers, thereby increasing performance).

Layer 8 is composed of open-celled, unicellular, rigid, porous, polyurethane foam, with a density of 10 to 18 in/ft$^3$ and a thickness of 0.250 inches.

All of the aforementioned layers, except layer 5, are held together by their respective resin systems from the material manufacturers. The armor materials are then laid into matched metal molds, with an applied pressure of 125 PSI. The material is allowed to cure in a heat source for two hours at approximately 220° F.

The combined thickness of this armor system is approximately 1.250 to 1.475 inches for class IV protection from 30.06 armorpiercing rounds. Thickness is reduced to 0.880 to 1.000 inches for Class III level protection against the 7.62 mm. 150/M-80 round.

Figure 2:
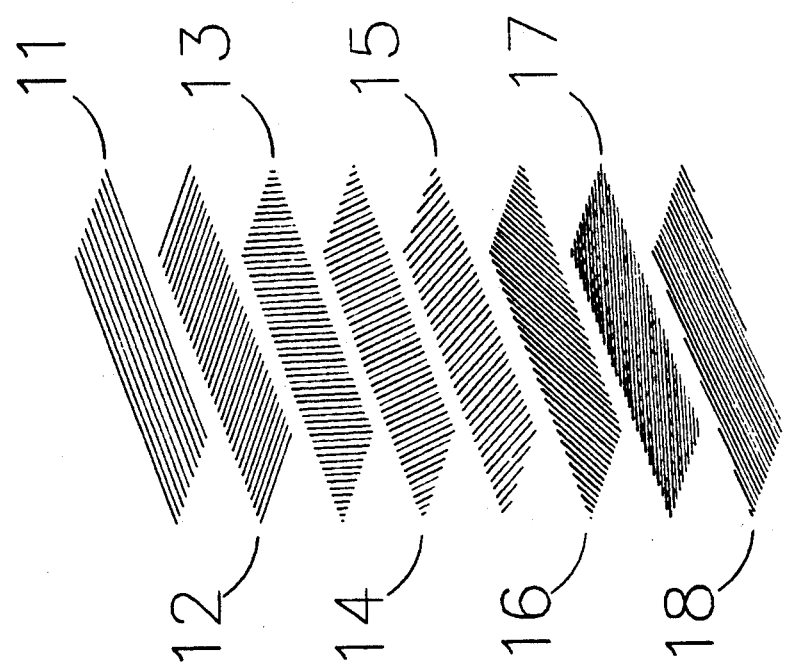
FIG. 2 is an exploded, perspective view of the eight symmetrically-arranged, unidirectional fiber orientations of several of the different layers.

FIG. 2 shows the orientation of the armor fibers used in this armor system, specifically, those used in layers 2, 3, 4, 6, 7, and 9. The armor fibers are symmetrically arranged at 22.5° intervals to result in eight different unidirectional fiber orientations, 11, 12, 13, 14, 15, 16, 17, is. The adjacent fiber orientations are shown as follows: 11 at 0°, 12 at 90°, 13 at 67.5°, 14 at 45°, 15 at 22.5°, 16 at 112.5°; 17 at 157.5°, 18 at 135°.

The different fiber orientations allow more fibers to engage a projectile on impact, resulting in improved, multi-hit performance and in reduced backface deformation. So arranged, the materials in the different layers remain in a constant tension state, improving ballistic performance.

A performance increase of 4 can be achieved with these added orientation, i.e. penetrations and deformations have been decreased as much as four times compared to test samples of materials using only 0° and 90° fiber orientations.

Figure 3:
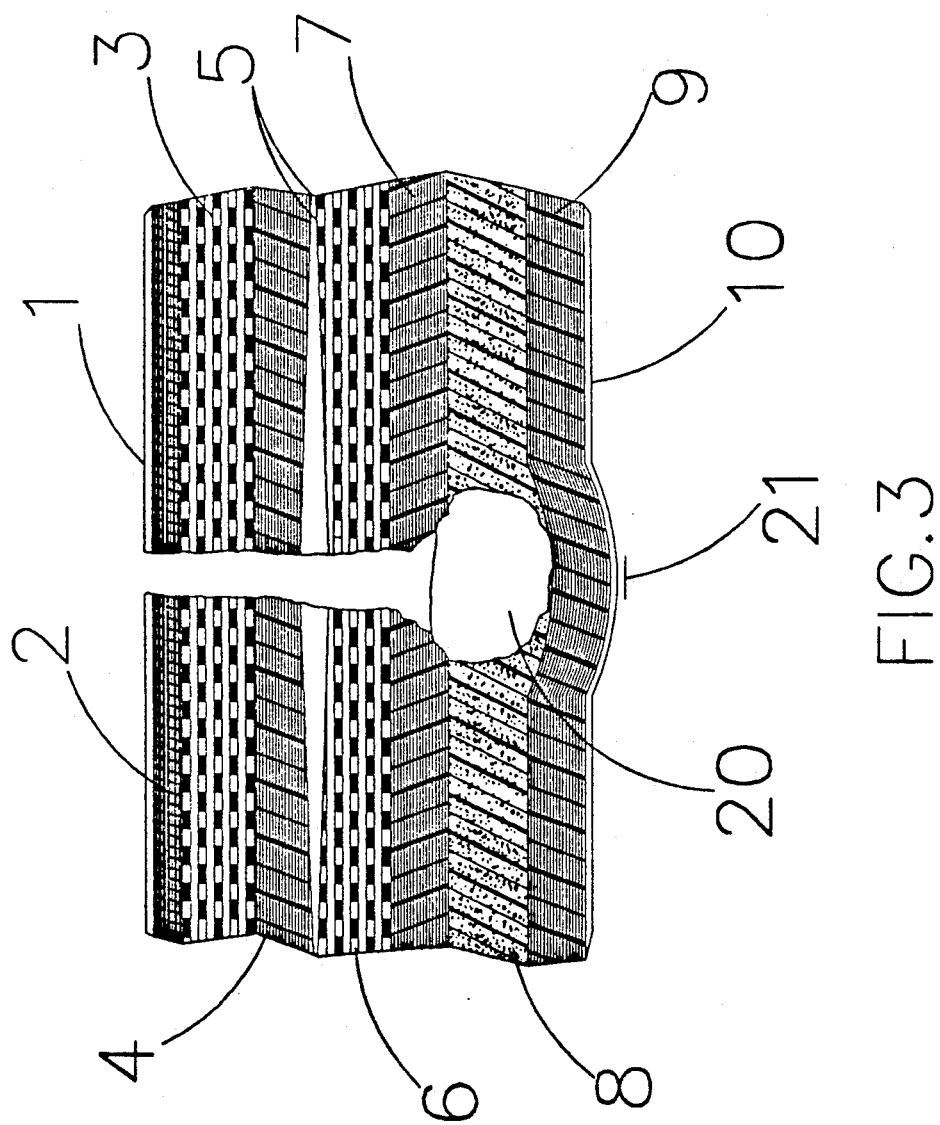
FIG. 3 is an enlarged, cross-sectional view illustrating the typical backface deformation and delamination of layers resulting after penetration of the body armor by a projectile.

FIG. 3 shows what happens to each layer when a projectile 20 penetrates the body armor.

Layers 1 and 10, made of carbon fiber, hold the armor matrix together; upon penetration from the projectile 20, they allow the armor to expand outwardly, away from the wearer's body, in a controlled, delamination fashion.

As a projectile 20 penetrates the armor system along projectile path 19, it strikes the layer 2, the outer strike surface, made of boron carbide, the third hardest material known to exist. The boron fibers transfer stresses throughout the armor over a large surface area, thereby reducing the impact on the armor, an effect known as interfacial coupling. The boron carbide strike surface also helps to break up the projectile 20 or blunt it, slowing penetration through the rest of the armor layers.

The projectile 20 next encounters layer 3, made up of layers of unidirectional aramid fibers. The layers of aramid fibers are arranged as shown in FIG. 2., allowing the fibers to remain in a constant tension state, thereby improving the ballistic performance of the armor.

Layer 4 is made up of layers of SPECTRA SHIELD, which has a strain wave velocity that is twice that of aramid fiber. High strain wave velocity allows a material to absorb and disperse a projectile's 20 impact energy over a larger area.

Because of their different strain wave velocities, aramid fiber and SPECTRA SHIELD have different rates of penetration when struck by a projectile 20. Because the layers of aramid fibers 3, 6, are alternated with the layers of SPECTRA SHIELD 4, 7, a projectile 20 penetrating the armor has a chaotic trip through the armor layers, losing 10% more velocity than if it traveled through all aramid fibers or all SPECTRA SHIELD layers. Further, the reduced strain wave velocity of aramid fibers actually helps the projectile 20 to mushroom as it encounters the succeeding SPECTRA SHIELD layer. As noted previously, each layer of SPECTRA SHIELD 4, 7, 9, is made up of forty laminations, symmetrically arranged in eight unidirectional orientations, as shown in FIG. 2. The staggered orientations result in armor with performance four times better than armor having layers arranged with only two orientations; the additional orientations result in engagement of the projectile 20 by four times the number of fibers. Further, the additional fiber orientations increase the state of tension between fibers, so that the fibers give, absorb, and distribute more of the projectile's 20 impact energy, resulting in improved ballistic performance.

Figure 5:
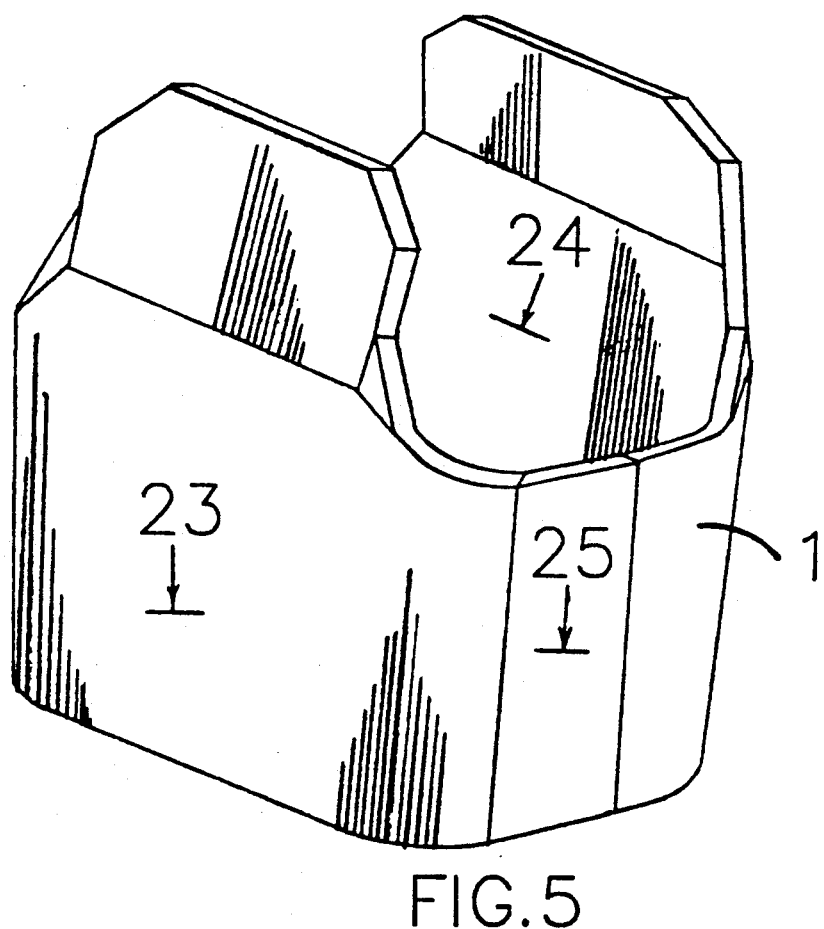
FIG. 5 is a perspective view of panels of the body armor material in the configuration of a ballistic vest.

When the projectile 20 passes through layer 5, the two layers of metallic foil separate, as shown in FIG. 5. When this process of delamination occurs, energy is transferred away from the wearer of the armor, reducing the extent of penetration by 7 to 8%, and reducing backface deformation (tests have shown). Additional layers of back to back metallic foil can be placed between the other layers to increase the delamination effect.

The projectile 20 comes to rest in layer 8, an open-celled, unicellular, rigid, porous, polyurethane foam. Layer 8, an expansion layer, is made up of material which gives the projectile 20 room to mushroom and expand when the projectile 20 impacts against layer 9, made of SPECTRA SHIELD. Material is displaced, causing backface deformation 21, as shown in FIG. 3.

Figure 4:
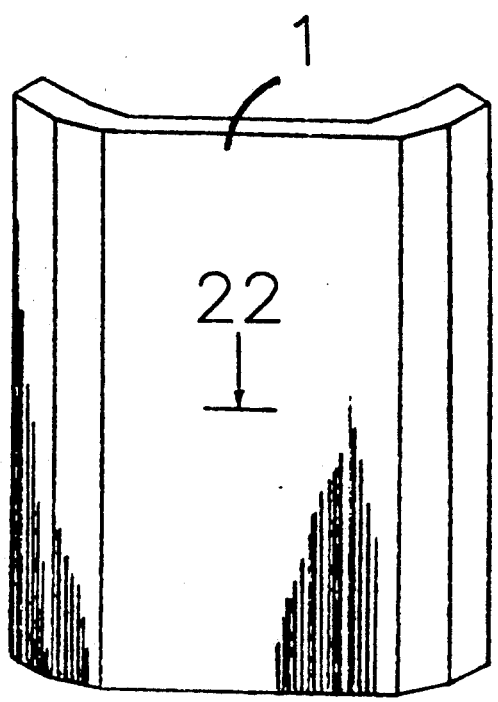
FIG. 4 is a front perspective view of an insert panel of body armor made in accordance with the present invention.

FIG. 4 shows an insert panel 22 made of the body armor material described supra. Insert panels 22 are placed in pouches on the front and back of body armor vests. FIG. 5 shows a tactical vest made of the material described supra. Dimensions for the vest are taken from NASA Reference Publication 1024, Volume 2: A Handbook of Antropometric Data. The reference manual lists the major dimensions of human bodies in nine groupings, based on the following percentiles: 1, 5, 10, 25, 50, 75, 90, 95, 99. This non-flexible body armor comes in nine different sizes to better fit and conform to the human body. Front panel 23 and back panel 24 are identical in size and configuration, and thus are interchangeable, lowering production cost. Front panel 23 and back panel 24 are constructed to protect a wearer's throat and the back of his neck. Front panel 23 and back panel 24 are tailored to permit full rotation of the upper arm. Front panel 23 and back panel 24 are barrel-shaped in order to keep front panel 23 off the wearer's chest cavity, thereby preventing projectile 20 from causing backface deformation 21 to come into contact with the human body, resulting in severe injury or death. Each vest has a side panel 25 between front panel 23 and back panel 24. Side panel 25 prevents side penetration by a projectile 20.

Figure 6:
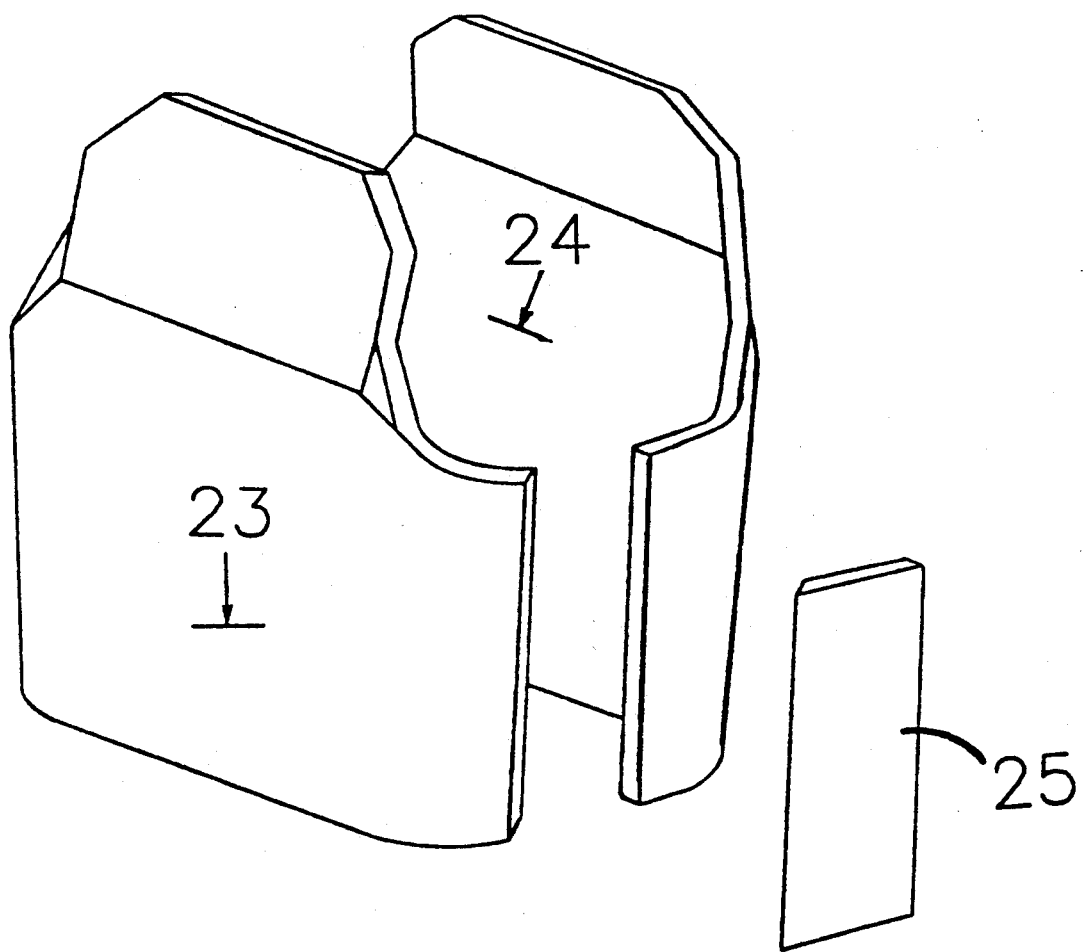
FIG. 6 is the same view as FIG. 5, with a side panel of ballistic material removed.

FIG. 6 shows the tactical vest with a side panel 25 removed. Front panel 23 and back panel 24 have angled edges which align with the corresponding angled edges of side panel 25. The two side panels 25, one on each side of the wearer, are interchangeable.

Figure 7:
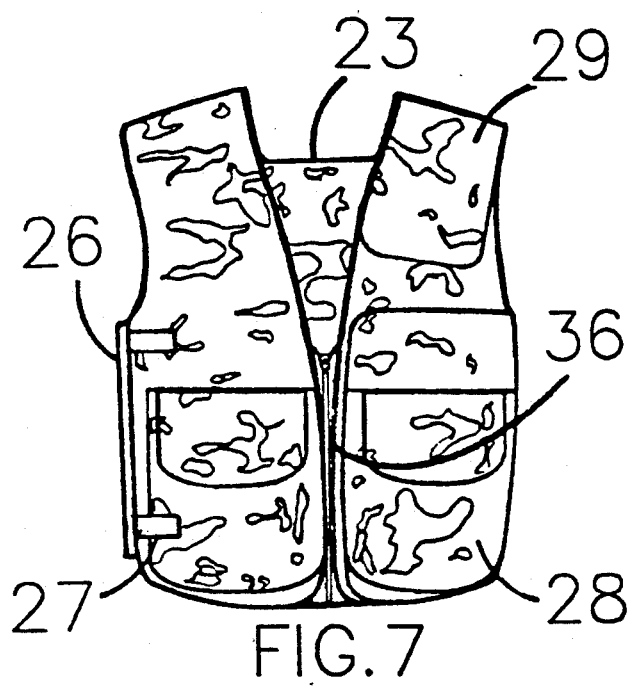
FIG. 7 is a front view of a vest-type carrier containing body armor panels made in accordance with the present invention.
Figure 8:
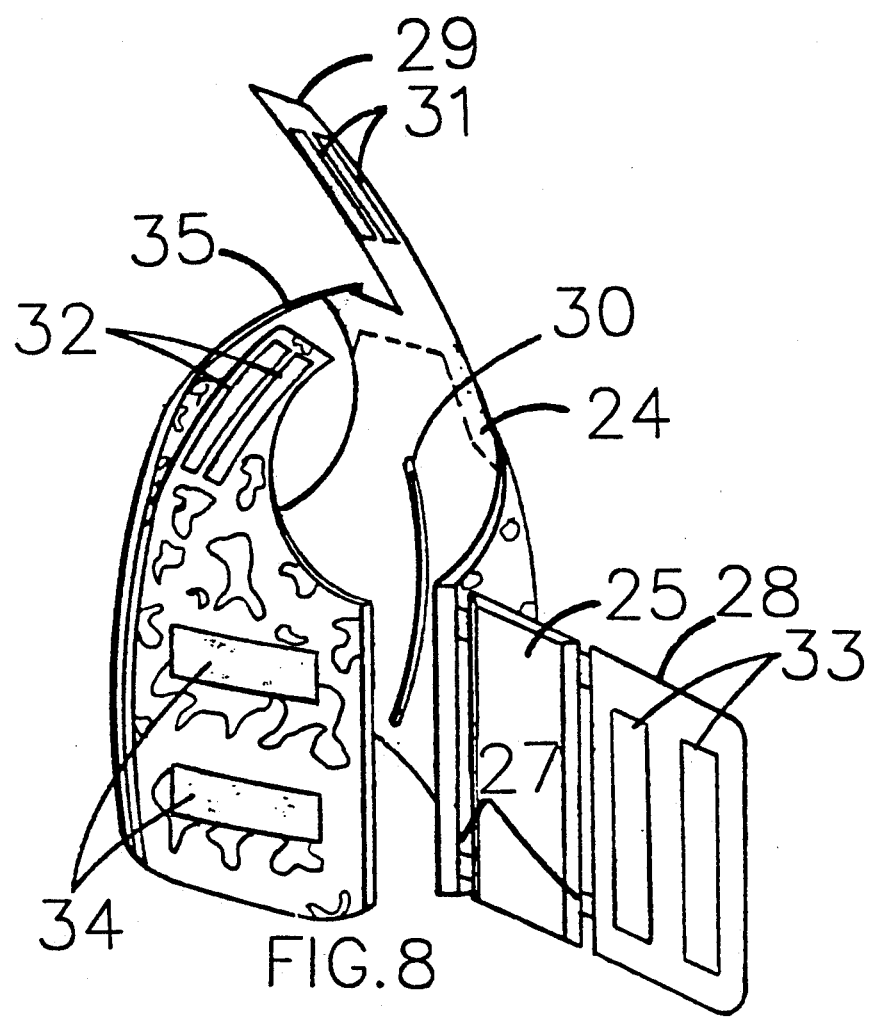
FIG. 8 is a side perspective view of a vest-type carrier containing body armor panels, with the shoulder and side extension flaps open.

FIG. 7 and 8 show the tactical body armor situated in a vest-type carrier 26. The carrier 26 is made from a nylon-like material in a camouflage pattern. In FIG. 7, front panel 23 is inserted through front zipper 36 and under a front flap of camouflage material. Heavy duty elastic strips 27 connect the front, side, and back pieces of the carrier 26. Side extension flap 28 and shoulder extension flap 29 hold the carrier onto the wearer's body.

In FIG. 8, back panel 24 is slipped through back zipper 30. Side panel 25 is slipped into the carrier's 26 side camouflage material, one on each side. Side extension flap 28 has side VELCRO strips 33 which fasten to lower front VELCRO strips 34 when the vest is in use. Shoulder extension flap 29 has shoulder VELCRO strips 31 which fasten to upper front VELCRO strips 32 when the vest is in use. To enter the vest armor, the wearer opens side extension flap 28 and shoulder extension flap 29. The wearer slides his right arm through loop 35. Shoulder extension flap 29 is pulled down and shoulder VELCRO strips 31 are fastened to upper front VELCRO strips 32. Side extension flap 28 is pulled around wearer's body and side VELCRO strips 33 are fastened to lower front VELCRO strips 34. The elastic strips 27 allow the side panels 25 to adjust to the wearer's body and to mate the edges of the side panels 25 to the edges of front panel 23 and back panel 24. This vest can be put on in five seconds.

The vest-carrier design shown in FIG. 7 and 8 transfers the weight of the body armor over a large area of the wearer's upper torso, which reduces the weight borne by the wearer's shoulders by 75%.

In testing the body armor material, it has been found that deformation is considerably reduced.

| Deformation Test Data | | | | | | |
|---|---|---|---|---|---|---|
| Armor Type | Round | Type | Bullet Mass | Velocity (ft/s) | Range (ft.) | Hits | Inches of Deformation |
| Class III | 9 mm. | FMJ | 124 gr | 1090 | 15 | 4 | .032 |
| | .357 | JSP | 150 gr | 1395 | 15 | 4 | .062 |
| | .223 | JSP | 55 gr | 3240 | 15 | 3 | .187 |
| | .308 | Sp | 165 gr | 2700 | 50 | 3 | .500 |
| | 7.62 mm | M-80 | 150 gr | 2750 | 50 | 6 | .750 |
| Class IV | 30.06 | A.P. | 165 gr | 2850 | 50 | 1 | 1.500 |

FMJ - FULL METAL JACKETED
JSP - JACKETED SOFT POINT
SP - SPIRE POINT
AP - AMOR PIERCING

Although the invention has been described and illustrated in the above preferred embodiment, the invention is not intended to be limited only to that description. Those skilled in the art will recognize that variations and modifications can be made without departing from the scope of the invention.

I claim:

1. A hard body armor set of ballistic material layers for Class III protection comprising:
   a first subset of two carbon fiber layers, said first subset constituting an outer surface;
   a second subset of a plurality of aramid layers, consisting of unidirectional aramid fibers, said layers so disposed so that said fibers have orientations at 22.5° increments;
   a third subset of a plurality of polyethylene layers consisting of unidirectional polyethylene fibers, said layers so disposed so that said fibers have orientations at 22.5° increments;
   a fourth subset of two metallic foil layers without any binder disposed between them;

a fifth subset of a plurality of aramid layers, consisting disposed so that said fibers have orientations at 22.5° increments;

a sixth subset of a plurality of polyethylene layers consisting of unidirectional polyethylene fibers, said layers so disposed so that said fibers have orientations at 22.5° increments;

a seventh subset of open-celled, unicellular, porous, rigid material, an eighth subset of a plurality of polyethylene layers consisting of unidirectional polyethylene fibers, said layers so disposed so that said fibers have orientations at 22.5° increments;

a ninth subset of two carbon fiber layers;

resin systems disposed upon each of the layers in the first subset, the second subset, the third subset, the fifth subset, the sixth subset, the eighth subset, and the ninth subset;

a surface of each of said subsets in full contact with a surface of the next higher-numbered subset;

said hard body armor set, after arrangement of said subsets, being molded and heated until cured, and having a total thickness ranging from 0.880 to 1.475 inches.

2. The hard body armor set of claim 1, further comprising two metllic foil layers without any binder disposed between them being interposed between the second subset and the third subset; and two metallic foil layers without any binder disposed between them being interposed between the fifth subset and the sixth subset.

3. A hard body armor set of ballistic material layers for Class III and Class IV protection comprising:

a first subset of two carbon fiber layers, said first subset constituting an outer surface;

a second subset of a plurality of boron carbide layers, consisting of unidirectional boron carbide fibers;

a third subset of a plurality of aramid layers, consisting of unidirectional aramid fibers, said layers so disposed so that said fibers have orientations at 22.5° increments;

a fourth subset of a plurality of polyethylene layers consisting of unidirectional polyethylene fibers, said layers so disposed so that said fibers have orientations at 22.5° increments;

a fifth subset of two metallic foil layers without any binder disposed between them;

a sixth subset of a plurality of aramid layers, consisting of unidirectional aramid fibers, said layers so disposed so that said fibers have orientations at 22.5° increments;

a seventh subset of a plurality of polyethylene layers consisting of unidirectional polyethylene fibers, said layers so disposed so that said fibers have orientations at 22.5° increments;

an eighth subset of open-celled, unicellular, porous, rigid material;

a ninth subset of a plurality of polyethylene layers consisting of unidirectional polyethylene fibers, said layers so disposed so that said fibers have orientations at 22.5° increments;

a tenth subset of two carbon fiber layers;

resin systems disposed upon each of the layers in the first subset, the second subset, the third subset, the fourth subset, the sixth subset, the seventh subset, the ninth subset, and the tenth subset, a surface of each of said subsets in full contact with a surface of the next higher-numbered subset;

said hard body armor set, after arrangement of said subsets, being molded and heated until cured, and having a total thickness ranging from 0.880 to 1.475 inches.

4. The hard body armor set of claim 3, further comprising two metallic foil layers without any binder disposed between them being interposed between the third subset and the fourth subset; and two metallic foil layers without any binder disposed between them being interposed between the sixth subset and the seventh subset.

5. A hard body armor set of ballistic material layers comprising:

a first subset of two carbon fiber layers;

a second subset of a plurality of aramid layers consisting of unidirectional aramid fibers, said layers so disposed so that said fibers have orientations at 22.5° increments;

a third subset of a plurality of aramid layers consisting of unidirectional aramid fibers, said layers so disposed so that said fibers have orientations at 22.5° increments;

a fourth subset of two metallic foil layers without any disposed binder between them;

a fifth subset of a plurality of aramid layers consisting of unidirectional aramid fibers, said layers so disposed so that said fibers have orientations at 22.5° increments;

a sixth subset of a plurality of aramid layers consisting of unidirectional aramid fibers, said layers so disposed so that said fibers have orientations at 22.5° increments;

a seventh subset of open-celled, unicellular, porous, rigid material;

a eighth subset of a plurality of polyethylene layers consisting of unidirectional polyethylene fibers, said layers so disposed so that said fibers have orientations at 22.5° increments;

a ninth subset of two carbon fiber layers;

resin systems disposed upon each of the layers in the first subset, the second subset, the third subset, the fifth subset, the sixth subset, the eighth subset, and the ninth subset;

a surface of each of said subsets in full contact with a surface of the next higher-numbered subset;

said hard body armor set, after arrangement of said subsets, being molded and heated until cured, and having a total thickness ranging from 0.880 to 1.475 inches.

6. The hard body armor set as claimed in claim 5, further comprising two metallic foil layers without any binder disposed between them being interposed between the second subset and the third subsets; and two metallic foil layers without any binder disposed between them being interposed between the fifth subset and the sixth subset.

7. The hard body armor set as claimed in claim 5, further comprising a plurality of boron carbide layers, consisting of unidirectional boron carbide fibers being interposed between the first subset and the second subset.

8. A hard body armor set of ballistic material layers comprising:

a first subset of two carbon fiber layers;

a second subset of a plurality of polyethylene layers consisting of unidirectional polyethylene fibers, said layers so disposed so that said fibers have orientations at 22.5° increments;

a third subset of a plurality of polyethylene layers consisting of unidirectional polyethylene fibers, orientations at 22.5° increments;

a fourth subset of two metallic foil layers without any binder disposed between them;

a fifth subset of a plurality of polyethylene layers consisting of unidirectional polyethylene fibers, said layers so disposed so that said fibers have orientations at 22.5° increments;

a sixth subset of a plurality of polyethylene layers consisting of unidirectional polyethylene fibers, said layers so disposed so that said fibers have orientations at 22.5° increments;

a seventh subset of open-celled, unicellular, porous, rigid material;

an eighth subset of a plurality of polyethylene layers consisting of unidirectional polyethylene fibers, said layers so disposed so that said fibers have orientations at 22.5° increments;

a ninth subset of two carbon fiber layers;

resin systems disposed upon each of the layers in the first subset, the second subset, the third subset, the fifth subset, the sixth subset, the eighth subset, and the ninth subset;

a surface of each of said subsets in full contact with a surface of the next higher-numbered subset;

said hard body armor set, after arrangement of said subsets, said hard body armor set, after arrangement of said subsets, being molded and heated until cured, and having a total thickness ranging from 0.880 to 1.475 inches.

9. The hard body armor set as claimed in claim 8, further comprising two metallic foil layers without any binder disposed between them being interposed between the second subset and the third subsets; and two metallic foil layers without any binder disposed between them being interposed between the fifth subset and the sixth subset.

10. The hard body armor set as claimed in claim 8, further comprising a plurality of boron carbide layers, consisting of unidirectional boron carbide fibers being interposed between the first subset and the second subset.

* * * * *